Aug. 3, 1948. A. WOLF ET AL Re. 23,023

PHOTOELECTRIC CELL CIRCUIT

Original Filed April 22, 1944

INVENTORS
ALEXANDER WOLF.
GERHARD HERZOG.
BY R. Rehlaum
Daniel Stryker
ATTORNEY

Reissued Aug. 3, 1948

Re. 23,023

UNITED STATES PATENT OFFICE 23,023

PHOTOELECTRIC CELL CIRCUIT

Alexander Wolf and Gerhard Herzog, Houston, Tex., assignors to The Texas Company, New York, N. Y., a corporation of Delaware Original No. 2,431,899, dated December 2, 1947, Serial No. 532,290, April 22, 1944. Application for reissue April 30, 1948, Serial No. 24,244

5 Claims. (Cl. 250—41.5)

Our invention relates to light measurement, and particularly to an improved method and apparatus for determining the relative intensities of a plurality of light beams.

In the past, various instruments have been devised for differential light measurements by means of a plurality of photocells in a single circuit with suitable current or potential indicating devices. Such instruments, however, have required a standardized light source, and their calibration has varied with changes in the characteristics of such source. The circuits which have previously been proposed for differential photocell measurements have had certain other disadvantages, particularly in lack of flexibility as to range or sensitivity.

An object of our invention is to provide an improved method and apparatus for determining the relative intensities of a plurality of light beams.

A further object of this invention is to provide an improved photocell circuit for determining the relative intensities of beams of light from a single source, after subjecting said beams to unequal light absorption.

Another object of our invention is to provide a photocell circuit of the character described, having a circuit element adapted to calibration with reference to relative light intensities, substantially independent of fluctuations in the absolute intensity of the light source.

A still further object of our invention is to provide a dual photocell circuit of the character described, having means for pre-setting the range or sensitivity, means for adjusting the zero-point balance at a reference value of relative illumination of the photocells, and variable means adapted to balance the circuit at other relative illumination intensities and adapted to control associated circuits of continuous recording devices, flow control devices, and the like.

Other objects and advantages of our invention will be apparent from the following description.

Although it will be evident to those skilled in the art that the present invention may be applied to differential light measurements involving more than two light beams and photocells, its widest application involves the comparison of only two light intensities, and our invention will be illustrated with particular reference to a dual photocell circuit.

Figure 1:
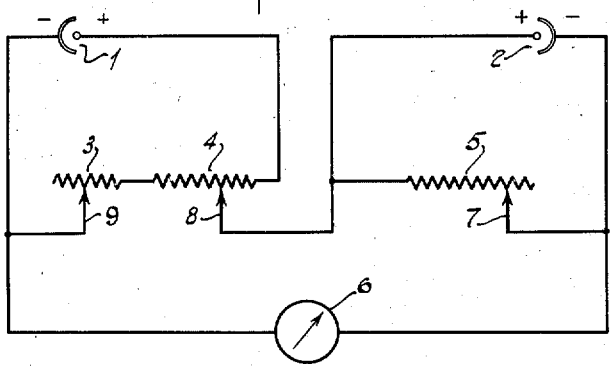

One modification of our dual photocell circuit is illustrated diagrammatically in Fig. 1 of the accompanying drawing. Referring to Fig. 1, it is seen that photocell 1 is shunted by an adjustable resistance 3 in series with the total resistance of a variable potentiometer 4, and that photocell 2 is shunted by a second adjustable resistance 5. The potential drop in the shunt 5 due to the current generated by cell 2 is opposed by a variable proportion of the potential drop in the shunt 3—4 due to the current generated by cell 1, which may be more brightly illuminated than cell 2. The opposition of these potentials is secured by connecting the tapped resistance 5 in a bridge circuit in series with the tapped resistance 3 and the variable resistance of potentiometer 4, with proper polarity connections to the photocells as shown in the drawing. A suitable current responsive device 6 such as a galvanometer in the bridge circuit indicates any unbalance between the potential across the shunt 5 and the potential across the bridge circuit portion of the shunt 3—4.

The circuit is first pre-set for range or sensitivity by adjustment of the tap or sliding contact 7 of resistance 5. The value chosen for this setting will depend upon the range of light intensities to be measured and upon the total resistance of the potentiometer 4, as more fully discussed below. The zero-point balance is then obtained at a suitable reference value of the relative illumination of the photocells 1 and 2. A desirable zero-point for most purposes comprises full illumination of both cells by a single light source which is preferably positioned to effect approximately equal illumination of the cells. The zero-point balance is secured by setting the sliding contact 8 of potentiometer 4 so that the total resistance is in the bridge circuit and then adjusting the tap or sliding contact 9 of resistance 3 to obtain zero current in the bridge circuit, as indicated by responsive element 6. In this manner zero-point balance is secured at equal potential drop across the total shunt resistance of each cell.

After obtaining zero-point balance, the illumination of cell 2 may be decreased by means of a screen, filter, optical wedge, or the like, which has been standardized for percentage transmission for light of the same characteristics as the light source employed. In order to avoid differences between chromatic absorption characteristics of filters and the chromatic response of the photocells, it is preferred to employ screens for calibration. With decreased illumination of cell 2, the circuit may again be balanced for zero bridge current by adjustment of the sliding contact 8 of potentiometer 4. The percentage of the total resistance 4 required to balance the circuit thus constitutes one calibration point, and others may be obtained in the same manner by the use of additional screens of standardized transmission values.

The calibration of potentiometer 4, as described above, represents a correlation of the balancing resistance value (R4 bal.) and the ratio of the illumination reaching photocell 2 to that reaching cell 1. With proper choice of circuit values, as discussed below, this correlation becomes, within the accuracy required for most measurements, $$\frac{\text{Illumination of cell 2}}{\text{Illumination of cell 1}} = Cx\,\frac{R3+R4\text{ bal.}}{R3+R4\text{ total}}$$

where C is a constant related to the characteristics of the photocells. Since this relationship involves the light intensities only in the form of a ratio, the calibration of the potentiometer 4 is independent of the absolute values of the light intensities. This characteristic of our circuit is of great value in applications to instruments such as colorimeters, turbidometers, densitometers, and the like. The calibration of instruments of this type which incorporate our dual photocell circuit may be maintained substantially constant, irrespective of changing characteristics of the light source due to age deterioration, line voltage fluctuation, and the like.

The maintenance of calibration, irrespective of change in absolute light values over a wide range, is illustrated by the following specific example:

*Example*

The circuit of Fig. 1 of the drawing is employed with the following resistance values:

| | Ohms |
|---|---|
| R4 total | 22 |
| R5 | 25 |

The photocells comprise blocking layer cells having the following characteristics:

| Illumination, foot-candles | Open Circuit Potential, millivolts | | Short Circuit Current, microamperes | |
|---|---|---|---|---|
| | Cell 1 | Cell 2 | Cell 1 | Cell 2 |
| 10 | 90.0 | 88.5 | 38.0 | 35.8 |
| 15 | 106.0 | 104.0 | 55.0 | 52.4 |
| 20 | 117.5 | 115.0 | 71.5 | 68.2 |
| 30 | 132.0 | 129.0 | 105.0 | 100.1 |

After balancing the circuit for zero-point with a standardized light source equally illuminating both cells, a screen having a transmission ratio of ⅔ is interposed between the light and cell 2. The circuit is then balanced for two different intensities of the light source. The values of resistances R3 and R4 required for balance in each case are shown in the following table:

| Illumination of Cell 1, foot-candles | Illumination of Cell 2, foot-candles | Resistances in Galvanometer Circuit at Balance, ohms | | |
|---|---|---|---|---|
| | | R5 | R3 | R4 |
| 30 | 30 | 25.0 | 1.8 | 22.0 |
| 30 | 20 | 25.0 | 1.8 | 14.4 |
| 15 | 10 | 25.0 | 1.8 | 14.4 |

Our circuit is adapted for use with any photoelectric elements of the type which transform light energy to electrical energy, and all such elements are referred to herein as photocells. The range of absolute light intensities within which relative intensity measurements can be made with our circuit will, of course, depend on the characteristics of the particular photocells employed. In any case, however, it is desirable to operate in the intensity range over which the power output of the cell is substantially linear with respect to illumination. We prefer to employ current generating photocells of the barrier layer or blocking layer type, and with such cells the absolute light intensities should be below 50 foot-candles at the cell surface, and preferably below 20 foot-candles.

In order to obtain the desired constancy of calibration with our circuit it is also important to select the proper resistance values for the particular photocells employed. The total shunt resistance for each cell in our circuit should be substantially less than the internal resistance of the cell at the highest light intensity to which the cell is to be exposed. When employing photocells of the usual blocking layer types, we prefer to employ a shunt resistance ranging from about 1% to about 10% of the cell internal resistance.

If the total resistance of the calibrated potentiometer 4 is fixed, the range of measurable illumination ratios will be from 100% to $$\frac{100\times R3}{R3+R4\text{ total}}\text{ per cent}$$

of the zero-point ratio. If the photocells have substantially identical characteristics, the lowest measurable ratio will also be equal to $$\frac{100\times R3}{R5}\text{ per cent}$$

of the zero-point ratio. It is generally most convenient to pre-set R5 to the desired sensitivity, and then adjust R3 for zero-point balance.

It will be evident from the above description that our photocell circuit has advantages which make it particularly desirable for colorimeter applications in continuous analysers, recorders, controllers, and the like. One such application is illustrated diagrammatically in Fig. 2 of the accompanying drawing. In this modification of our invention, our dual photocell circuit is incorporated in an automatic continuous oxygen analyzer which is adapted to control associated instruments such as continuous recorders, flow control devices, and the like.

Figure 2:
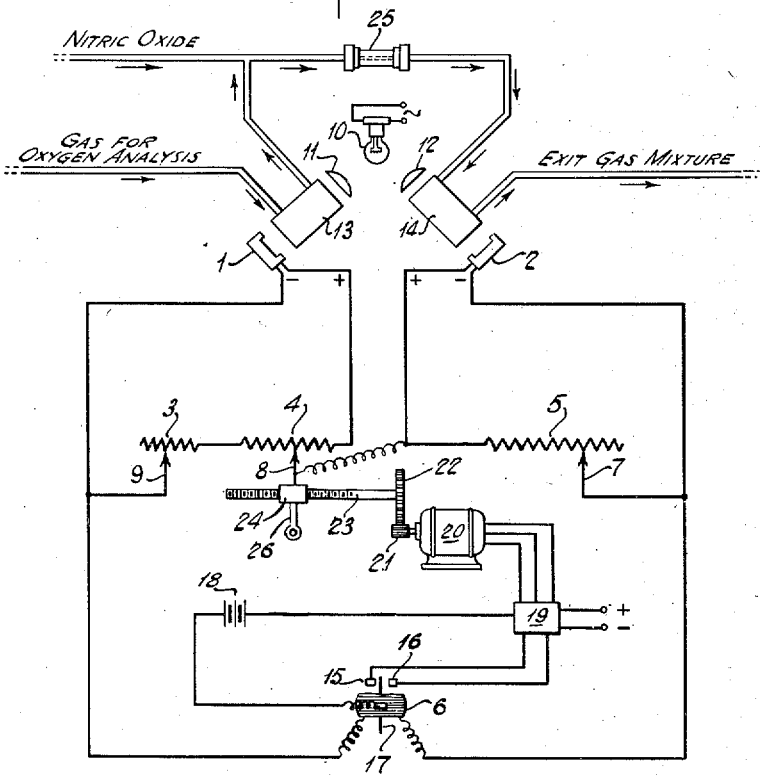

Referring to Fig. 2, light from lamp 10 passes through lenses 11 and 12 and through absorption cells 13 and 14 to photocells 1 and 2. These cells are connected in a bridge circuit with adjustable resistance 3, potentiometer 4, a second adjustable resistance 5, and a galvanometer 6, in the same manner as in Fig. 1 which has previously been described. In this case, the galvanometer 6 is equipped with contacts 15 and 16 with which the galvanometer needle 17 may complete circuits from battery 18 to relay 19 when the photocell circuit is unbalanced. The relay 19, in turn, serves to connect a power source to a reversible motor 20. The motor 20, through suitable driving means such as gears 21, 22, and threaded shaft 23, propels the traveler 24 which carries the sliding contact 8 of potentiometer 4.

The circuit described above is balanced for zero-point with no absorptive media in the absorption cells 13 and 14. On the introduction of a medium of greater absorption in cell 14 than in cell 13, the circuit will automatically reach a new balance, and the proportion of R4 in the bridge circuit will constitute a measure of the relative absorption in cell 13 to that in cell 14.

When this apparatus is employed for continuous oxygen analysis of a gas mixture, as illustrated in Fig. 2, the mixture to be analysed is charged at a constant rate, and is first passed through absorption cell 13. As a result, the light transmitted through the charge mixture will serve as a reference standard for the photocell circuit. Nitric oxide, in excess of the amount required to react with all of the oxygen in the charge gas, is introduced at a constant rate into the gas stream flowing from absorption cell 13. The gases then flow through a suitable mixing chamber, such as the capillary tube 25 shown in the drawing. The oxygen and nitric oxide in the gas mixture react to form nitrogen dioxide, and the resulting gas mixture then flows through the absorption cell 14.

The light absorption in cell 14 by the colored gas, nitrogen dioxide, will be proportional to the amount of oxygen in the charge gas, and the potentiometer 4 may thus be calibrated directly in terms of oxygen content of the gas mixture. This calibration can, of course, be effected by charging gas mixtures of known analyses. If the range of oxygen content of the charge gas is known, the sensitivity of the instrument may be pre-set by adjusting the resistance 5 (and re-balancing for zero-point) so that the whole range of the potentiometer 4 is utilized for the range of oxygen content of the gas mixture to be analysed.

It is evident that the instrument described above will automatically and continuously analyze a gas mixture for oxygen content, and indicate the analysis by the position of the traveler 24 and the sliding contact 8 of the potentiometer 4. An auxiliary lever 26, carried by the traveler 24, may serve as the actuating member of a suitable linkage for controlling the pen of a continuous recorder, or for actuating relays for the remote control of oxygen or air valves. Alternatively, the arm 26 may carry electrical contacts of relay actuating circuits for remote flow control devices. A predetermined time cycle of varying oxygen content of the charge gas may thus be controlled by means of cam-driven movable contacts, cooperating with contacts carried by the arm 26, for actuating the relays.

Various other modifications of our invention will, of course, be evident to those skilled in the art, and it is to be understood that the scope of our invention is in no way limited to the particular modifications illustrated in the drawings and discussed above. Any equivalents of either the apparatus elements or the electrical circuits described herein may be employed without departing from the scope of our invention. Only such limitations should be imposed on the scope of this invention as are indicated in the appended claims.

We claim:

1. In a photocell circuit adapted for the measurement of the relative intensities of a plurality of light beams, the combination of a reference photocell, an adjustable shunt resistance across said reference cell, a second photocell, a second adjustable shunt resistance across said second cell, the total shunt resistance across each of said photocells being substantially less than the minimum operating internal resistance of the cell, a bridge circuit connecting the shunt resistance of said second cell and a continuously variable portion of the shunt resistance of said reference cell ranging from the total shunt resistance of said reference cell to a fraction thereof so that the potentials across said resistances will be in opposition, and an indicating device in said bridge circuit adapted to indicate balance or unbalance of said potentials.

2. In a photocell circuit adapted for the measurement of the relative intensities of a plurality of light beams, the combination of a reference photocell, a shunt resistance across said reference cell, said shunt resistance comprising an adjustable resistance in series with the total resistance of a variable potentiometer, a second photocell, an adjustable shunt resistance across said second cell, the total shunt resistance across each of said photocells being less than 10% of the minimum operating internal resistance of the cell, a bridge circuit connecting the shunt resistance of said second cell, the adjustable resistance across said reference cell and the variable resistance of said potentiometer, and an indicating device in said bridge circuit adapted to indicate balance or unbalance of said potentials.

3. In a photoelectric measuring device adapted for the measurement of the relative absorption of light from two beams emitted from the same source, the combination of a light source, a reference photocell, a reference absorption cell interposed between said light source and said reference photocell, a second photocell, a second absorption cell interposed between said light source and said second photocell, a shunt resistance across said reference photocell comprising an adjustable resistance in series with the total resistance of a variable potentiometer, said potentiometer having a sliding contact, means for driving said sliding contact, an adjustable shunt resistance across said second photocell, a bridge circuit connecting the shunt resistance of said second cell, the adjustable resistance and the variable resistance of said potentiometer so that the potential across said first named shunt resistance will be opposed to the potential across said adjustable resistance and said variable resistance, means responsive to the current in said bridge circuit for actuating the driving means for the sliding contact of said potentiometer to effect a balance of said potentials, and means connected to said sliding contact for indicating the position of said sliding contact and thus the relative light absorption in said absorption cells.

4. In a photoelectric measuring device adapted for the measurement of the relative absorption of light from two beams emitted from the same source, the combination of a light source, a reference photocell, a reference absorption cell interposed between said light source and said reference photocell, a second photocell, a second absorption cell interposed between said light source and said second photocell, a shunt resistance across said reference photocell comprising an adjustable resistance in series with the total resistance of a variable potentiometer having a sliding contact and means for driving said sliding contact, an adjustable shunt resistance across said second photocell, the total shunt resistance across each of said photocells being substantially less than the minimum operating internal resistance of the cell, a bridge circuit connecting the shunt resistance of said second cell, the adjustable resistance and the variable resistance of said potentiometer so that the potential across said first named shunt resistance will be opposed to the potential across said adjustable resistance and said variable resistance, means responsive to the current in said bridge circuit for actuating the driving means for the sliding contact of said potentiometer to effect a balance of said potentials, and means connected to said sliding contact for indicating the position of said sliding contact and thus the relative light absorption in said absorption cells.

5. In a photoelectric measuring device adapted for the measurement of the relative absorption of light from two beams emitted from the same source, the combination of a light source, a reference photocell, a reference absorption cell interposed between said light source and said reference photocell, a second photocell, a second absorption cell interposed between said light source and said second photocell, a shunt resistance across said reference photocell comprising an adjustable resistance in series with the total resistance of a variable potentiometer having a sliding contact, and means for driving said sliding contact, an adjustable shunt resistance across said second photocell, the total shunt resistance across each of said photocells being less than 10% of the minimum operating internal resistance of the cell, a bridge circuit connecting the shunt resistance of said second cell, the adjustable resistance and the variable resistance of said potentiometer so that the potential across said first named shunt resistance will be opposed to the potential across said adjustable resistance and said variable resistance, means responsive to the current in said bridge circuit for actuating the driving means for the sliding contact of said potentiometer to effect a balance of said potentials, and means connected to said sliding contact for indicating the position of said sliding contact and thus the relative light absorption in said absorption cells.

ALEXANDER WOLF.
GERHARD HERZOG.